United States Patent [19]

Jozwiak

[11] Patent Number: 5,196,065
[45] Date of Patent: Mar. 23, 1993

[54] GARDEN SPRAY SHIELD APPARATUS

[76] Inventor: William J. Jozwiak, 8878 S. Allison St., Littleton, Colo. 80123

[21] Appl. No.: 780,157

[22] Filed: Oct. 21, 1991

[51] Int. Cl.$^5$ .............................................. B05C 11/00
[52] U.S. Cl. .................................... 118/504; 118/301
[58] Field of Search ............... 118/504, 505, 213, 301, 118/506; 47/1.7; 428/188

[56] References Cited

U.S. PATENT DOCUMENTS

| | | | |
|---|---|---|---|
| 1,677,714 | 7/1928 | Frease | 428/188 |
| 1,707,238 | 4/1929 | Small | 52/822 |
| 2,152,274 | 3/1939 | Papazian | 118/301 |
| 2,359,975 | 10/1944 | Duggan | 118/505 |
| 2,607,104 | 8/1952 | Foster | 428/212 |
| 2,954,752 | 4/1960 | Hayward | 118/505 |
| 3,027,870 | 4/1962 | Schirmer | 118/504 |
| 3,142,579 | 7/1964 | Brooks | 118/504 |
| 3,192,896 | 7/1965 | Irving | 118/505 |
| 4,276,852 | 7/1981 | Adams | 118/504 |

FOREIGN PATENT DOCUMENTS 1555771  11/1979  United Kingdom ................ 118/504

Primary Examiner—W. Gary Jones
Assistant Examiner—Brenda Lamb
Attorney, Agent, or Firm—Leon Gilden

[57] ABSTRACT

A garden shield includes a flat, flexible or rigid vertical wall shape and a continuous vertical wall defining a conduit formed with an upper cylindrical edge orthogonally oriented relative to the side wall to afford protection to desired vegetation, wherein the side wall is arranged in surrounding relationship relative to unwanted vegetation to subject the unwanted vegetation to herbicidal spray and the like while shielding adjacent plants from spray in use. The vertical wall structure is formed of a flexible shape retentent material and may be formed in various configurations for affording protection to centrally located or various other vegetation. A modification of the invention includes the vertical wall including conduits, with the conduit positioned adjacent an interior wall surface of the vertical wall with a lower portion of the vertical wall defining a screen and an upper vertical wall portion defining an impermeable web to direct spray against a wall and interiorly of the wall through the conduit and direct the spray into a charcoal body defined within the upper cylindrical edge.

2 Claims, 5 Drawing Sheets

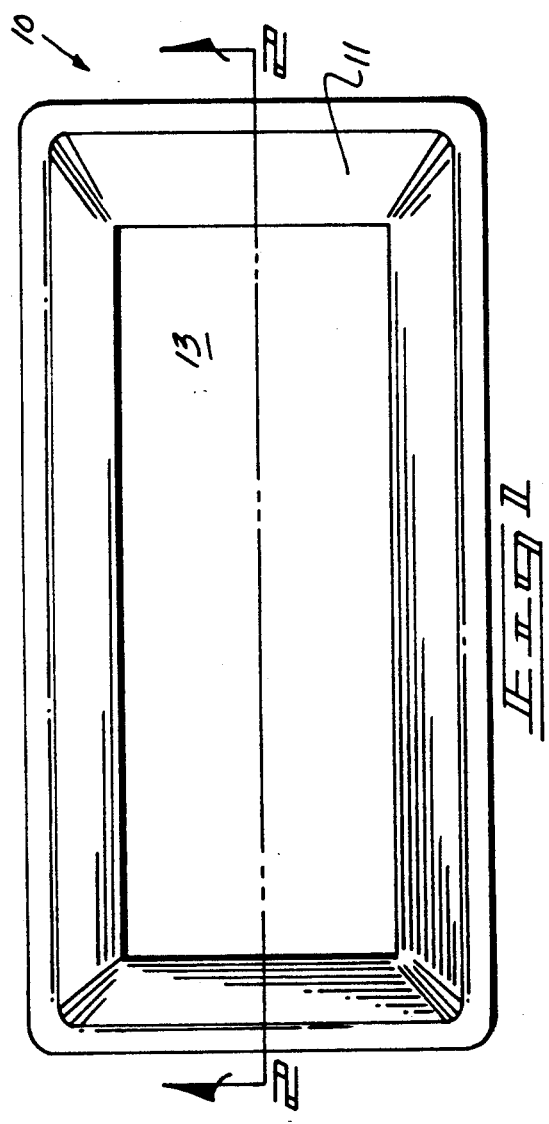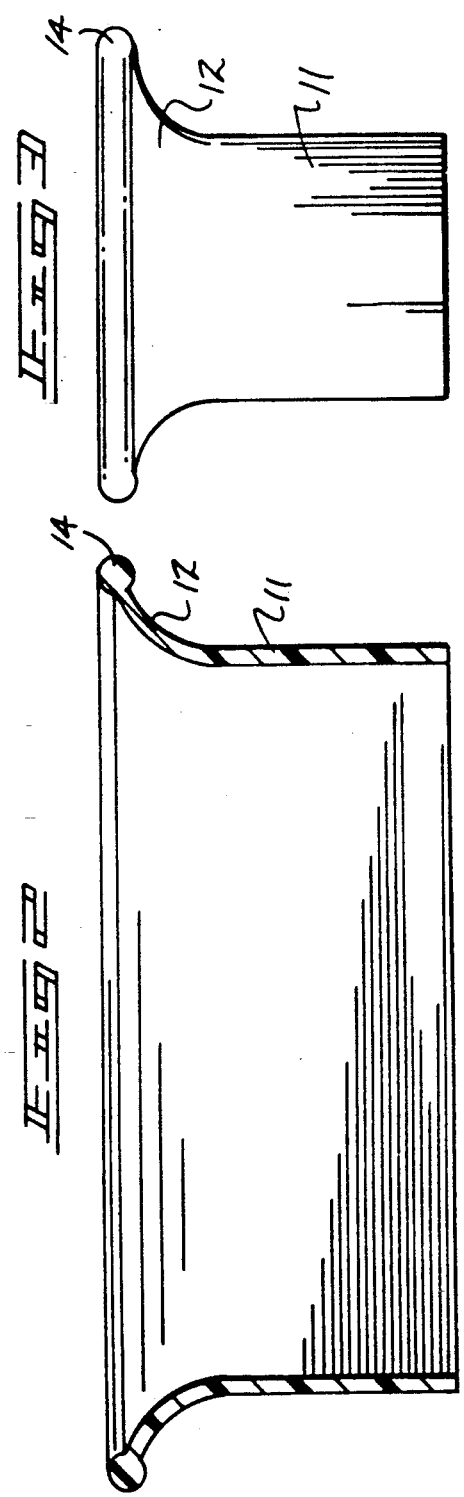

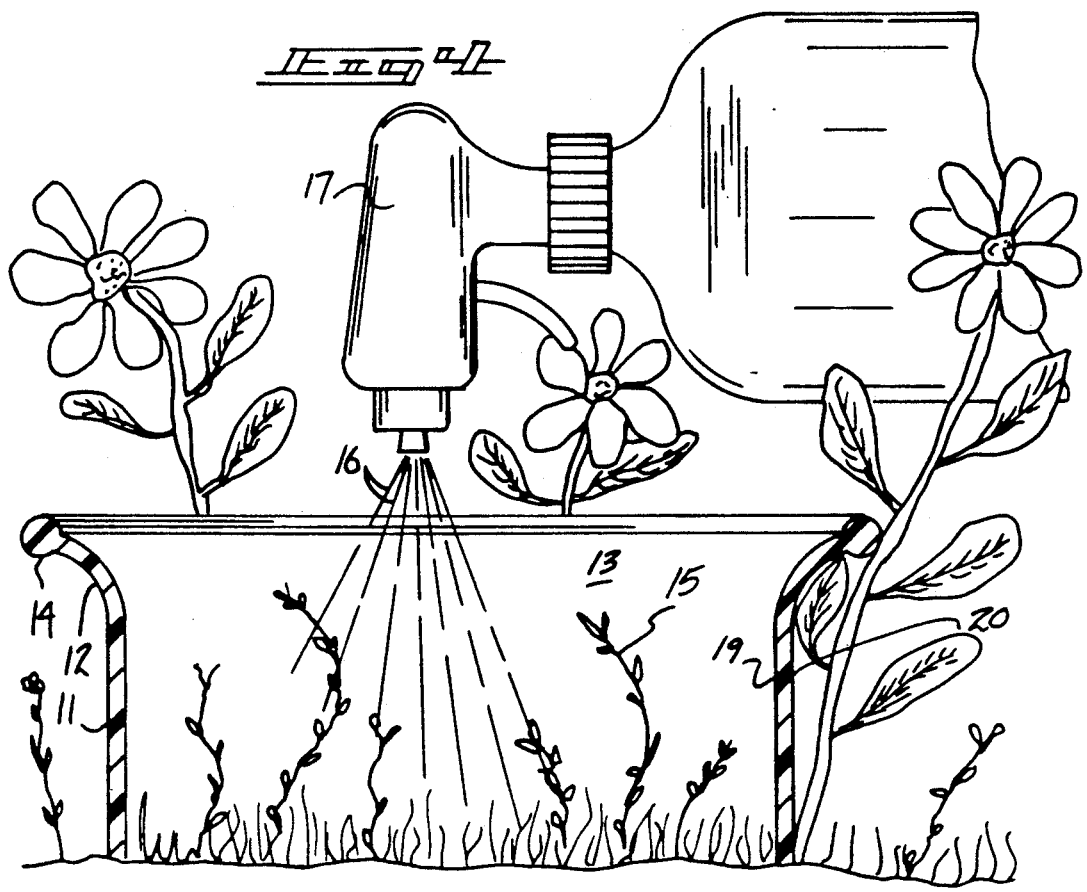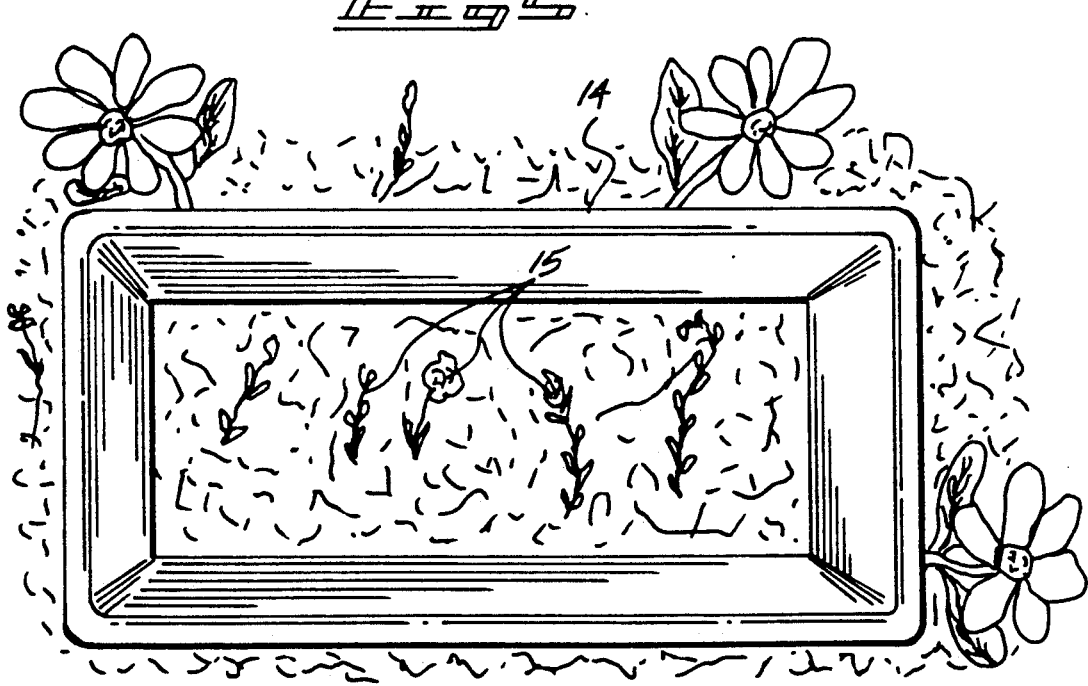

GARDEN SPRAY SHIELD APPARATUS

BACKGROUND OF THE INVENTION

1. Field of the Invention

The field of invention relates to shield apparatus, and more particularly pertains to a new and improved garden spray shield apparatus wherein the same is arranged to afford protection to surrounding vegetation during herbicidal spraying.

2. Description of the Prior Art

Shielding apparatus is utilized in the prior art to afford protection to various surrounding structure and environment during various procedures. For example, U.S. Pat. No. 4,850,868 to Wright, et al. sets forth a spray shield defining a tubular member arranged to be adapted to a working end of a dental hand piece to contain a direct material dispense from the hand piece to minimize airborne material directed into the atmosphere during a dental procedure.

U.S. Pat. No. 4,574,731 to Stevens, et al. sets forth a spray shield defining a thin planar sheet of material, with a handle mounted to an edge of the material to afford protection during a spraying procedure such as in painting and the like.

U.S. Pat. No. 4,874,206 to Sampson sets forth a tire wheel cover spray shield to afford protection to a tire during a spraying procedure.

As such, it may be appreciated that there continues to be a need for a new and improved garden spray shield apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of spray shield apparatus now present in the prior art, the present invention provides a garden spray shield apparatus wherein the same defines a flat, flexible or rigid vertical wall structure and a tubular wall structure of flexible material arranged in surrounding relationship relative to vegetation in subjecting the vegetation to herbicidal spray affording protection to adjacent vegetation. As such, the general purpose of the present invention, which will be described subsequently in greater detail, is to provide a new and improved garden spray shield apparatus which has all the advantages of the prior art spray shield apparatus and none of the disadvantages.

To attain this, the present invention provides a garden shield including a continuous vertical wall defining a conduit formed with an upper cylindrical edge orthogonally oriented relative to the side wall to afford protection to vegetation, wherein the side wall is arranged in surrounding relationship relative to vegetation to subject the vegetation to herbicidal spray and the like and shielding adjacent plants from spray in use. The vertical wall structure is formed of a flexible shape retentent material and may be formed in various configurations ranging from a flat (rigid or flexible) shape to a continuous conduit to afford protection to centrally located or various other vegetation. A modification of the invention includes the vertical wall including conduits, with the conduit positioned adjacent an interior wall surface of the vertical wall with a lower portion of the vertical wall defining a screen and an upper vertical wall portion defining an impermeable web to direct spray against a wall and interiorly of the wall through the conduit and direct the spray into a charcoal body defined within the upper cylindrical edge.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved garden spray shield apparatus which has all the advantages of the prior art spray shield apparatus and none of the disadvantages.

It is another object of the present invention to provide a new and improved garden spray shield apparatus which may be easily and efficiently manufactured and marketed.

It is a further object of the present invention to provide a new and improved garden spray shield apparatus which is of a durable and reliable construction.

An even further object of the present invention is to provide a new and improved garden spray shield apparatus which is susceptible of a low cost of manufacture with regard to both materials and labor, and which accordingly is then susceptible of low prices of sale to the consuming public, thereby making such garden spray shield apparatus economically available to the buying public.

Still yet another object of the present invention is to provide a new and improved garden spray shield apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic top view of the instant invention.

FIG. 2 is an orthographic view, taken along the lines 2—2 of FIG. 1 in the direction indicated by the arrows.

FIG. 3 is an orthographic end view, taken in elevation, of the instant invention.

FIG. 4 is an orthographic side view of the invention positioned within a garden environment.

FIG. 5 is an orthographic top view of the shield in position within a garden environment.

DESCRIPTION OF THE PREFERRED EMBODIMENT

Figure 6:
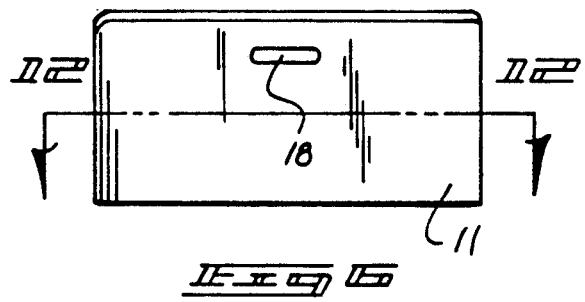
FIG. 6 is an orthographic side view of a shield coplanar configuration constructed of a flexible or rigid material utilizing a slotted handle therethrough which may include the charcoal feature described and illustrated in FIGS. 12, 13, and 14.

With reference now to the drawings, and in particular to FIGS. 1 to 14 thereof, a new and improved garden spray shield apparatus embodying the principles and concepts of the present invention and generally designated by the reference numeral 10 will be described.

Figure 7:
FIG. 7 is an isometric illustration of a corner structure for us with the shield in limited space availability.
Figure 8:
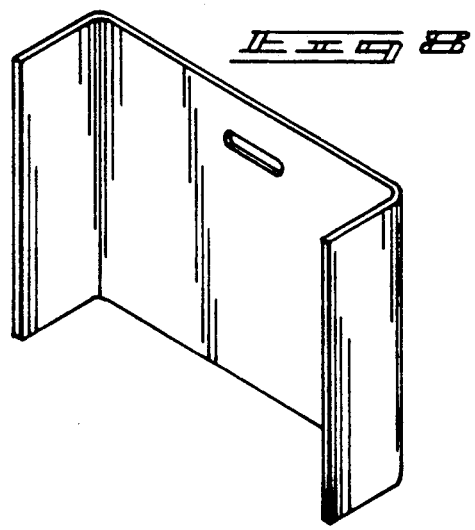
FIG. 8 is an isometric illustration of a generally "U" shaped shield construction.
Figure 9:
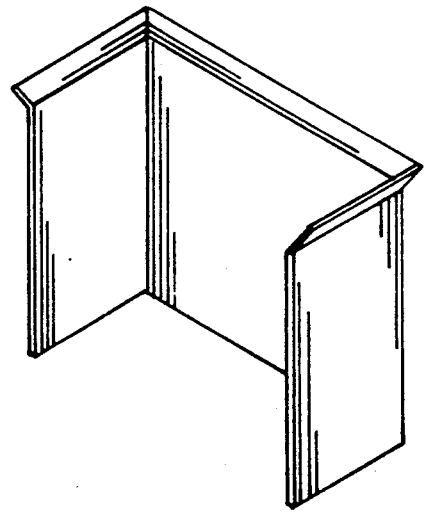
FIG. 9 is an isometric illustration of a "U" shaped shield utilizing an outwardly tapering upper flange.
Figure 10:
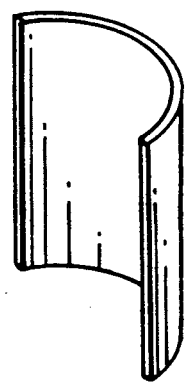
FIG. 10 is an isometric illustration of a semi-cylindrical shield configuration.
Figure 11:
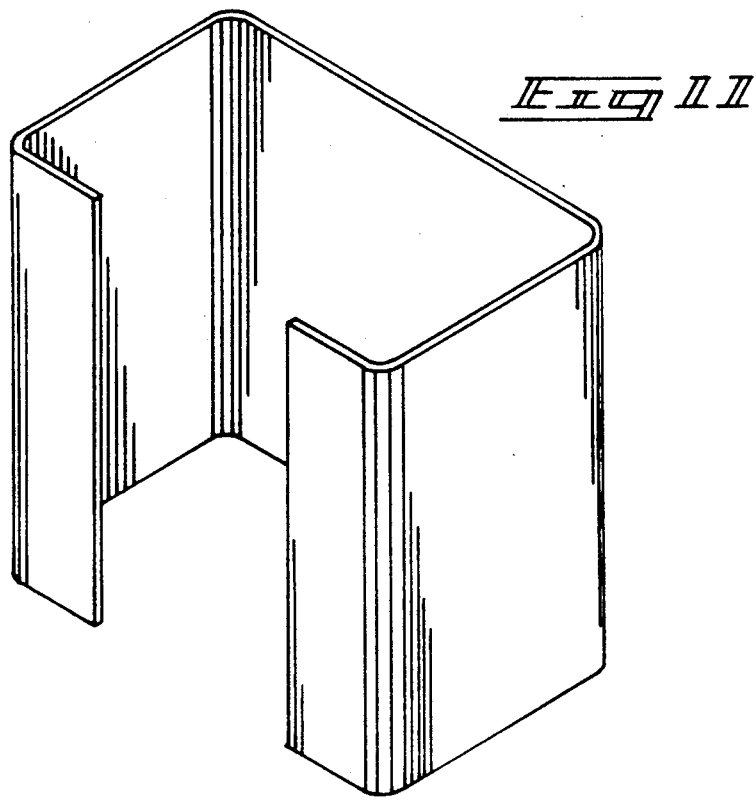
FIG. 11 is an isometric illustration of a shield defining a slot through a side wall thereof for access of spray within the shield.
Figure 12:
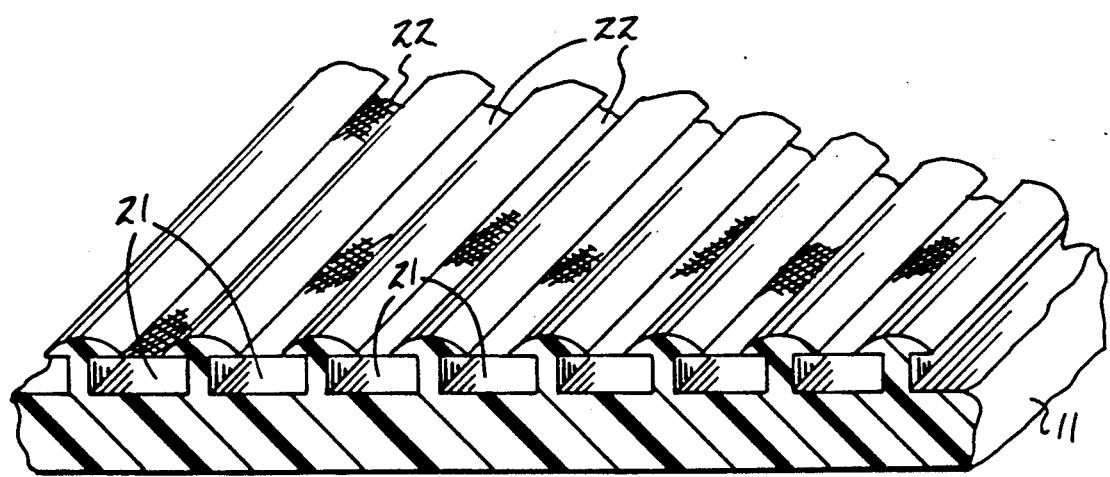
FIG. 12 is an orthographic view, taken along the lines 12—12 of FIG. 6 (with the charcoal feature) in the direction indicated by the arrows.
Figure 13:
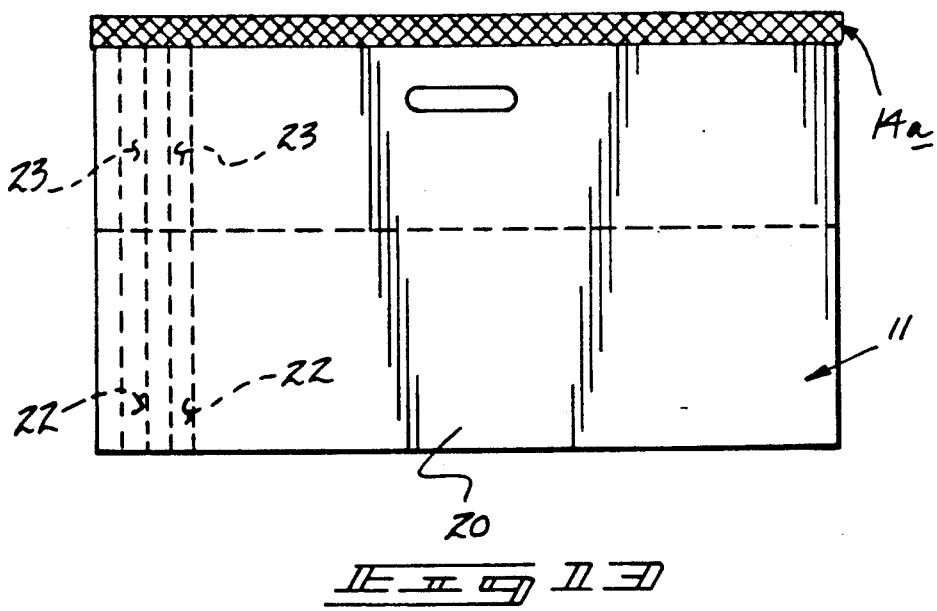
FIG. 13 is an enlarged orthographic view, as set forth in FIG. 6 (with the charcoal feature).

More specifically, the garden spray shield apparatus 10 of the invention essentially comprises a flexible vertical wall 11 formed of a memory retentent shape retentive material that optionally includes an outwardly flaring upper wall portion 12. The wall includes a continuous cylindrical upper edge 14 orthogonally oriented relative to the wall 11. In this manner, a central cavity 13 is provided wherein the shield is positioned in surrounding relationship relative to vegetation 15, as illustrated in FIG. 4, to accommodate the spraying of an herbicidal spray 16 from an associated applicator nozzle 17 or other suitable source. Adjacent vegetation exteriorly of the shield, as illustrated in FIG. 4 and FIG. 5 for example, is afforded protection upon engagement by the upper edge 14 and the wall structure. Further, it should be noted the wall 11 includes an interior wall surface 19 and an exterior wall surface 20. The FIG. 6 illustrates the wall illustrated of a vertical construction, as opposed to the use of an outwardly flared portion, as illustrated in FIG. 2. Further, FIG. 7 illustrates a right triangular wall segment, as well as "U" shaped segments of the FIGS. 8 and 9. A semi-circular segment 10 may also be utilized if desired. FIG. 11 illustrates a "C" shaped member defining a slot through the vertical wall to direct spray interiorly to vegetation contained therewithin.

Figure 14:
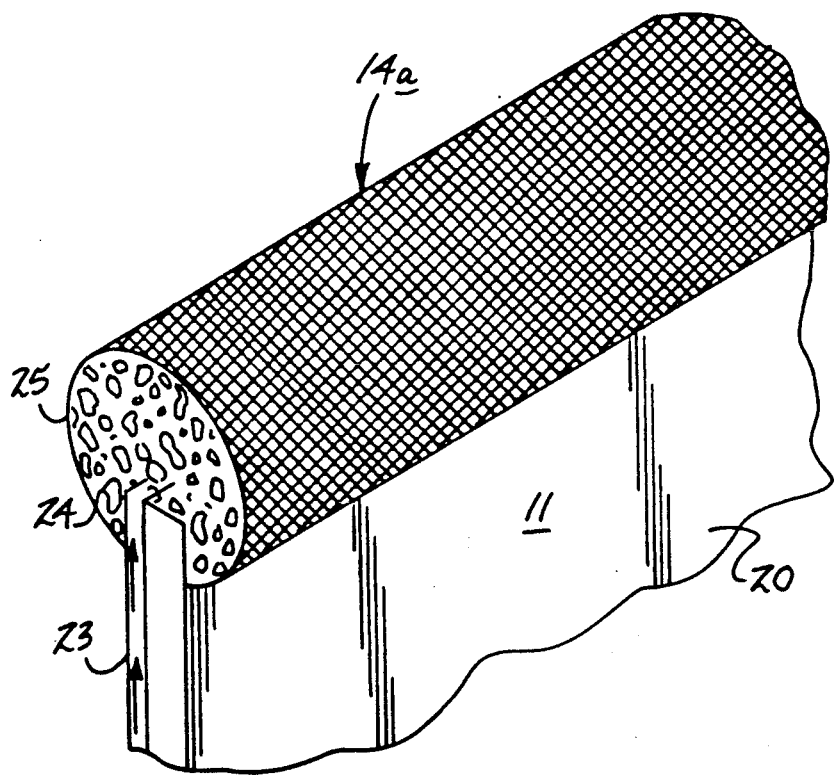
FIG. 14 is an isometric illustration, partially in section, of the shield structure as set forth in FIG. 13.

With reference to the FIGS. 1-3 and the FIG. 6 specifically, the vertical wall structure 11 may include in a modified version consisting of parallel conduits 21 within the vertical wall 11 that are positioned in adjacency relative to one another and positioned adjacent the interior wall surface 19. The interior wall surface 19 adjacent and in overlying relationship relative to the conduits 21 include a porous lower mesh screen conduit wall 22 (see FIGS. 12 and 13), with an upper impermeable conduit wall 23 projecting from the lower mesh screen conduit wall 22 upwardly to the modified cylindrical upper edge 14a. The modified cylindrical upper edge 14a includes a charcoal cylindrical body 24, with a surrounding screen exterior wall 25. In this manner, utilization of the organization in sunlight and the like during typical use in the summer months effects heating of the wall 11, wherein spray directed upon the interior wall surface 19 is directed through the mesh lower screen conduit walls 22 into the conduits, wherein heating of the wall 11 effects heating of the air within the conduits 21 directing the air upwardly, as illustrated in FIG. 14, through the upper impermeable conduit wall portion of each conduit into the cylindrical charcoal body 24 preventing spreading of the herbicide beyond borders defined by the vertical wall 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, flexible or rigid configuration and designs, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A garden spray shield apparatus, comprising,
   a continuous vertical wall, the vertical wall formed of a memory shaped retentive material, wherein the vertical wall includes an upper edge and a lower edge, wherein a through-extending conduit is directed between the upper edge and the lower edge, the upper edge including a continuous cylindrical upper edge member integrally mounted to the upper edge, and the vertical wall includes at least one through-extending handle slot, and the vertical wall includes an interior surface in confrontation with the conduit, and a plurality of parallel conduits are directed coextensively through the vertical wall extending from the lower edge to the upper edge in communication with the upper edge member, and the upper edge member includes a cylindrical charcoal body, with a mesh screen exterior wall formed about the charcoal body to permit vapors to be directed through the screen exterior wall.

2. An apparatus as set forth in claim 1 wherein each of the conduits is positioned adjacent the interior wall surface, and each of the conduits includes a porous lower mesh screen conduit wall directed from the lower edge medially of each vertical wall, and the interior wall surface includes an upper impermeable conduit wall directed from medially of each vertical wall to the upper edge to direct vapors into each conduit through the mesh screen conduit wall, subsequently through the upper impermeable conduit wall, and into the cylindrical charcoal body.

* * * * *